United States Patent [19]

Metten et al.

[11] Patent Number: 5,647,675
[45] Date of Patent: Jul. 15, 1997

[54] ANGULAR THRUST DISC

[75] Inventors: Norbert Metten, Herzogenaurach; Heinz Pfann, Erlangen, both of Germany

[73] Assignee: Ina Walzlager Schaeffler KG, Germany

[21] Appl. No.: 447,405

[22] Filed: May 23, 1995

Related U.S. Application Data

[63] Continuation-in-part of Ser. No. 262,939, Jun. 21, 1994, abandoned.

[30] Foreign Application Priority Data

Jul. 17, 1993 [DE] Germany ............... 9310708 U

[51] Int. Cl.⁶ ............... F16C 33/58; F16C 35/06
[52] U.S. Cl. ............... 384/620; 384/606; 384/622
[58] Field of Search ............... 384/618, 620, 384/621, 622, 606

[56] References Cited

U.S. PATENT DOCUMENTS

| | | | |
|---|---|---|---|
| 3,957,325 | 5/1976 | Babb | 384/622 |
| 3,972,574 | 8/1976 | Pitner | 384/621 |
| 3,981,549 | 9/1976 | Carullo | 384/622 |
| 4,042,309 | 8/1977 | Hiraga | 384/621 |
| 4,166,662 | 9/1979 | Chiba et al. | 384/622 |
| 4,733,979 | 3/1988 | Tsuruki | 384/620 |
| 5,110,223 | 5/1992 | Koch et al. | 384/620 |

FOREIGN PATENT DOCUMENTS

| | | | |
|---|---|---|---|
| 2346595 | 10/1977 | France | 384/618 |
| 3107086 | 1/1982 | Germany . | |
| 3840957 | 7/1989 | Germany . | |
| 31022 | 2/1990 | Japan | 384/622 |

*Primary Examiner*—Thomas R. Hannon
*Attorney, Agent, or Firm*—Bierman, Muserlian and Lucas LLP

[57] ABSTRACT

An angular thrust disc has a Z-shaped cross sectional profile, a free end of whose radially outer angular portion comprises radially inward directed projections arranged axially spaced from a free end thereof and made by chipless stamping, which projections engage into a peripheral groove of a shaft or a housing, and a free end of a radially inner angular portion of the angular thrust disc comprises circumferentially spaced and radially outward directed crimpings and recesses which form an installation safeguard and permit an admission of oil into the thrust bearing.

10 Claims, 5 Drawing Sheets

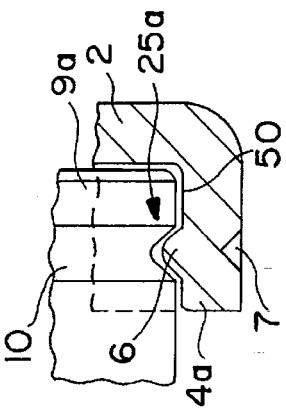
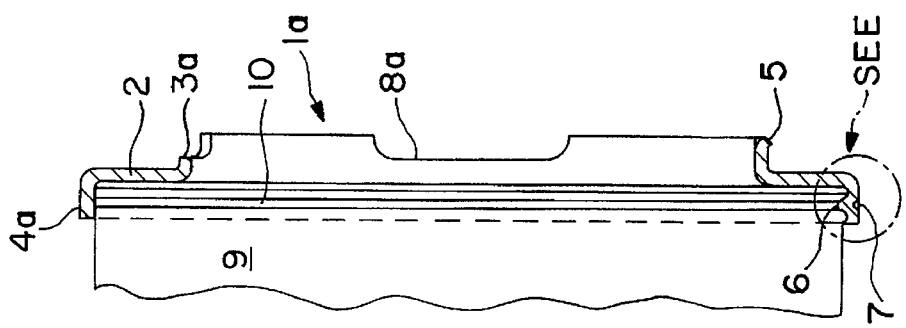
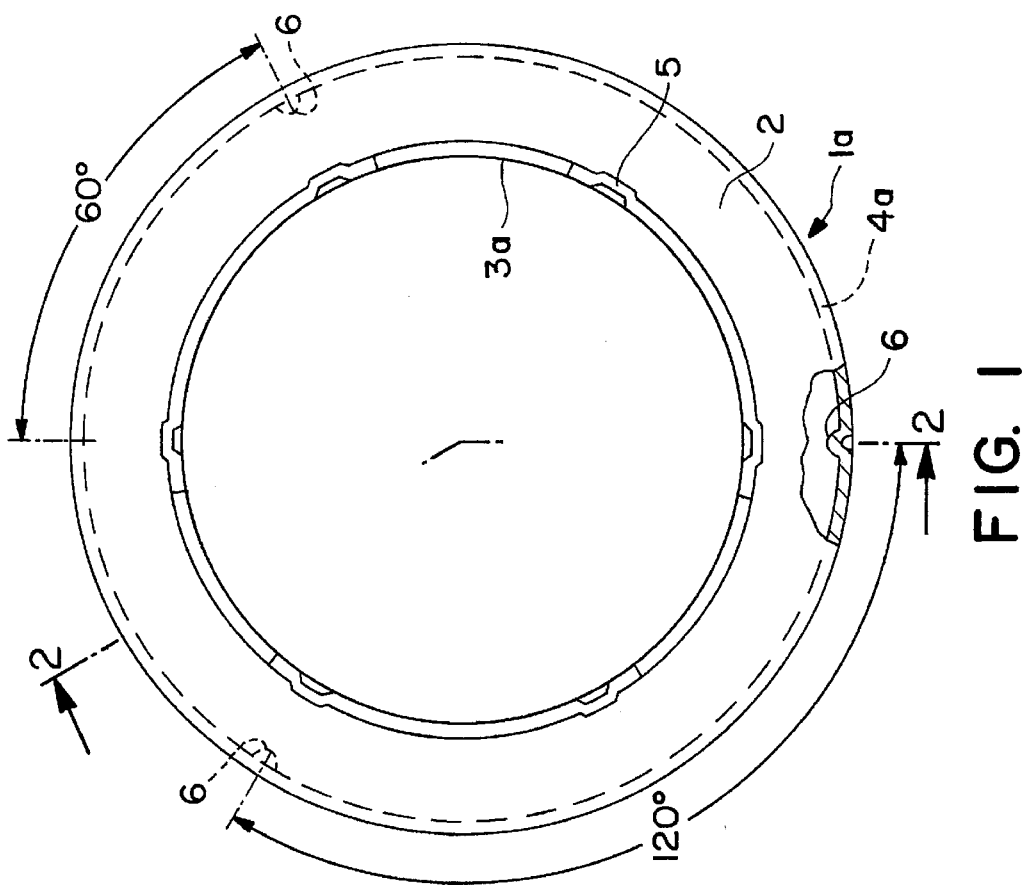

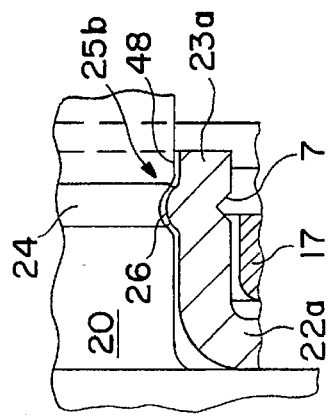
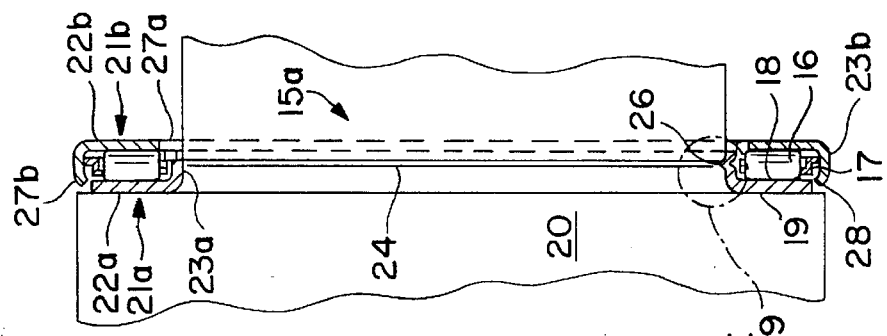
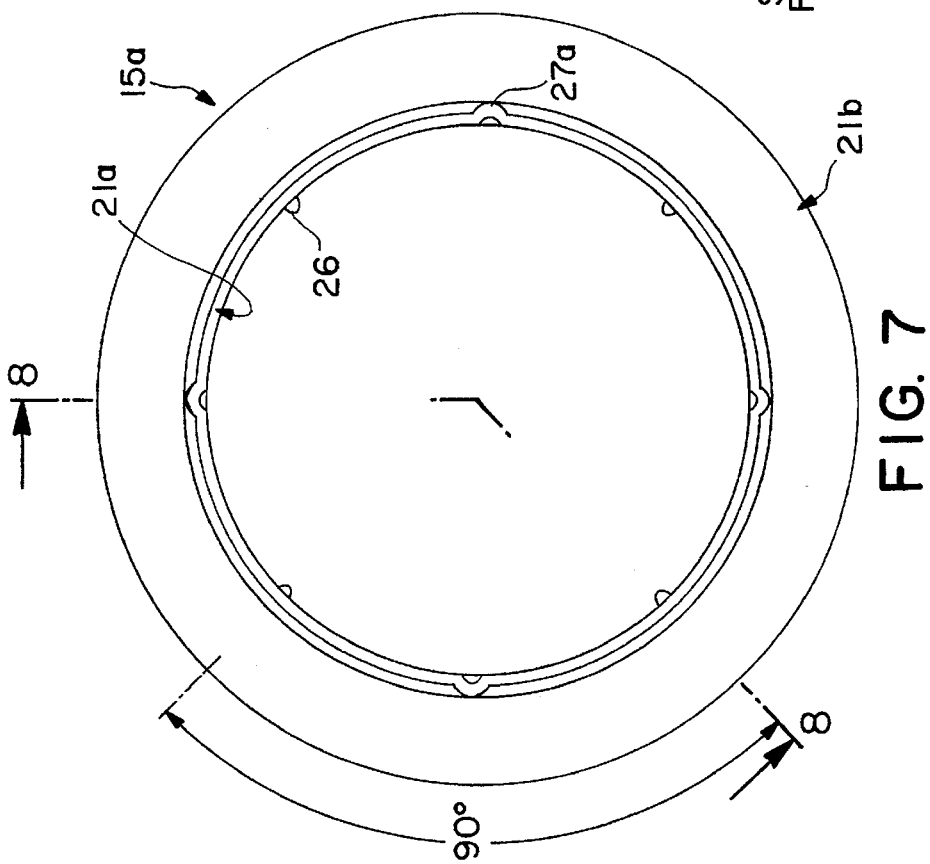

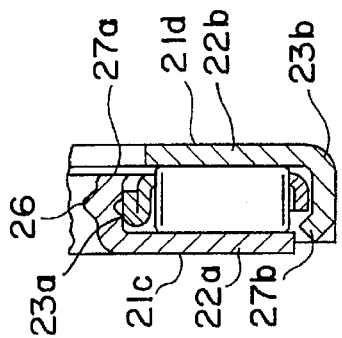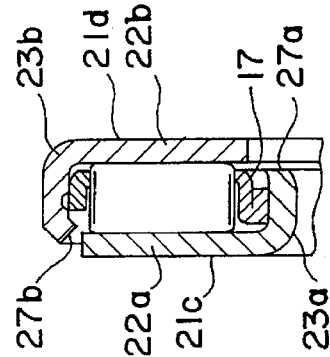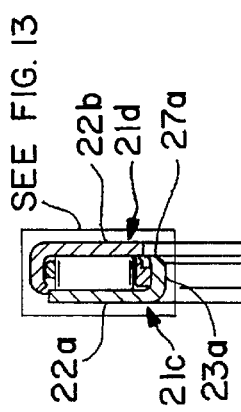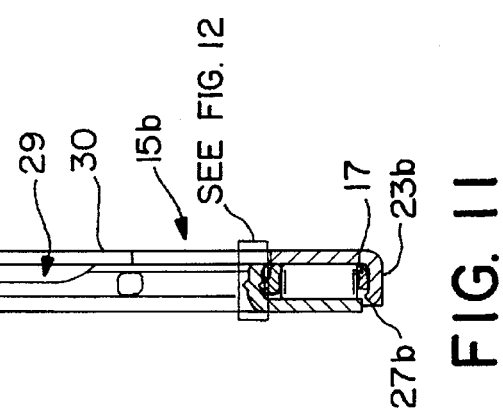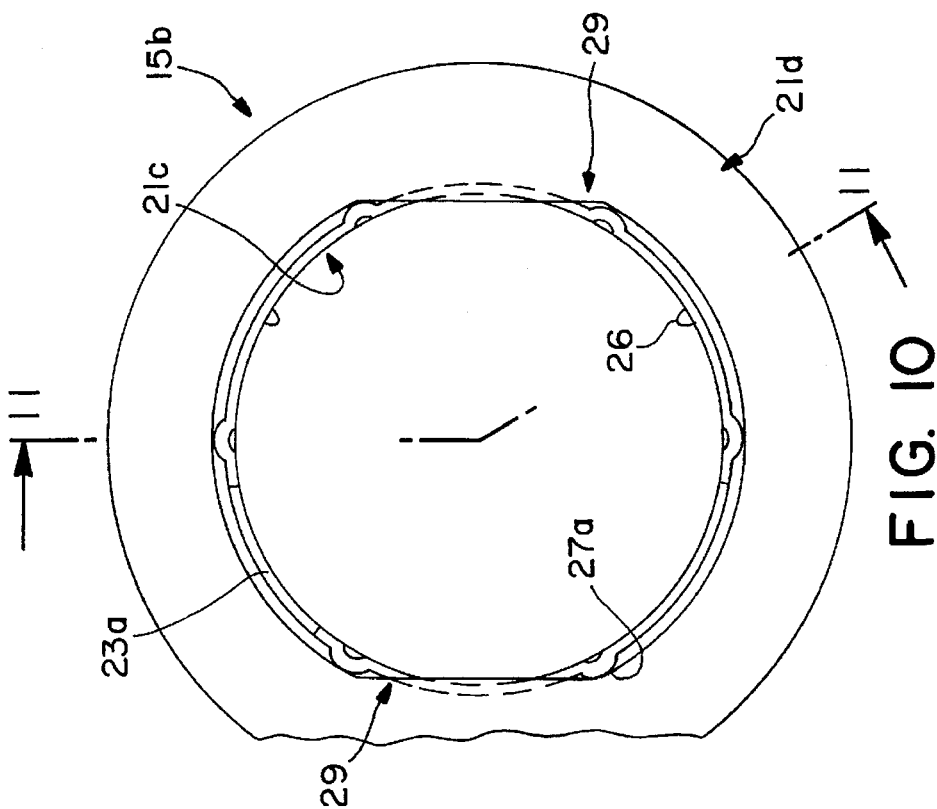

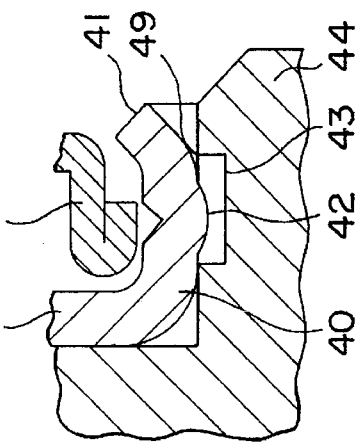
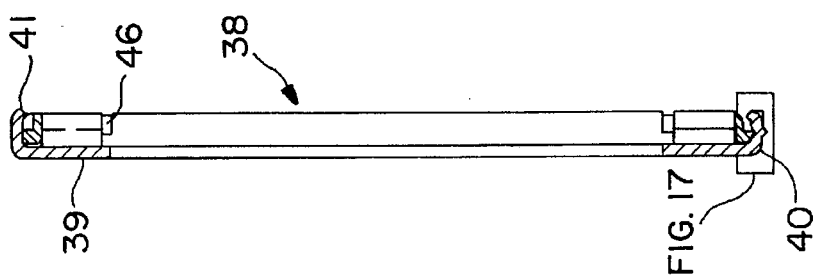
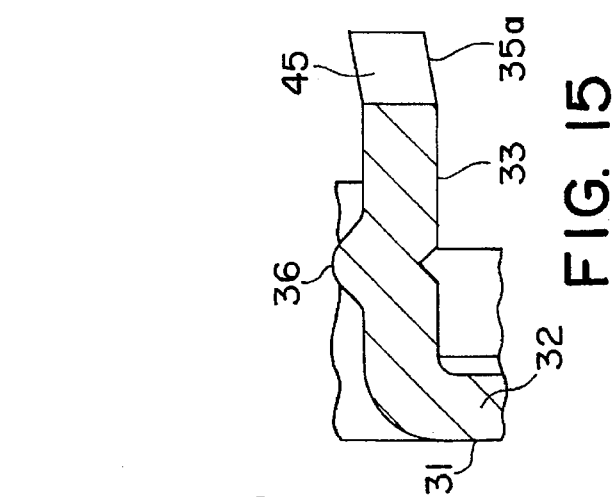
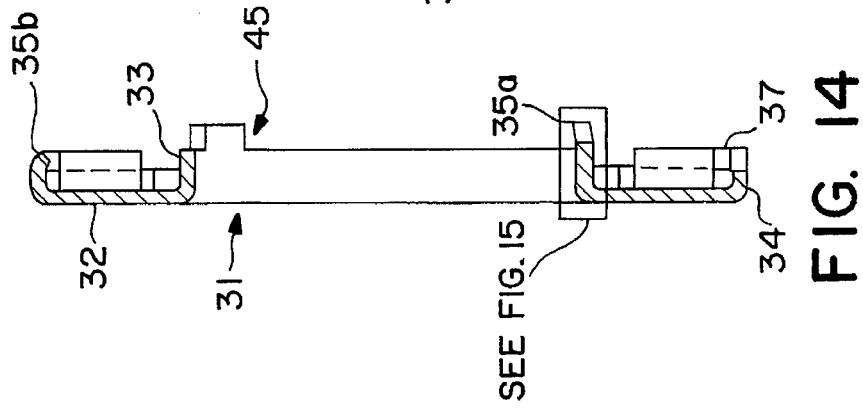

ANGULAR THRUST DISC

This application is a continuation-in-part of Ser. No. 262,939 filed Jun. 21, 1994 now abandoned.

FIELD OF THE INVENTION

The invention concerns an angular thrust disc and an angular thrust bearing assembly comprising a radial portion which forms a raceway for rolling elements and merges with at least one axial angular portion, comprising peripherally arranged retaining elements for effecting a guidance of the angular thrust disc in a housing or on a shaft, said retaining elements also serving for a direct or indirect guidance of the rolling elements.

BACKGROUND OF THE INVENTION

An angular thrust disc of this type is known from DE-PS 31 07 086 and comprises retaining means on an axial flange for centering a thrust bearing. The retaining means are comprised of a separate annular part which is fixed to the axial flange and comprises radially outwards oriented projections which serve to center and retain the angular thrust disc on a shoulder of a housing. A disadvantage of this construction is that the retaining means are an additional component involving higher manufacturing and assembly costs.

DE-A-38 40 957 discloses an angular thrust disc, in an axial portion whereof clips are made by punching. Another alternative retaining means described in this document is obtained by making incisions in the free end of the axially extending portion and turning over the material between the incisions radially to form a likewise elastic clip which, in the installed condition of the angular thrust disc or the thrust bearing, locks into a groove.

A common feature of both known solutions which involve machining is that the centering of the angular thrust disc or of the entire thrust bearing is not sufficiently exact for many installation conditions. Further, this clip configuration necessitates an at least relatively wide groove for the locking-in of the clip so that more mechanical work is involved in the manufacturing process.

From JP-A-2-31 022 thrust bearings are known, one angular thrust disc of which has an angular portion on its outer periphery and the other on its inner periphery, the angular portion of each angular thrust disc being directed towards the adjacent angular thrust disc and comprising on its free end, circumferentially spaced crimpings serving to guide the rolling bearing cage in a radially inward and radially outward direction. In another embodiment of the thrust bearing of this document, a free end of the angular portion comprises a radially outwards oriented bend by which an interference fit of the angular thrust bearing in a housing can be obtained. Due to the manner of installation, there is a disadvantageously high pre-tension in the angular thrust disc which can lead to stress cracking.

U.S. Pat. No. 4,166,662 shows a Z-shaped angular thrust disc for a thrust bearing. On the free end of the radially outer angular portion of this thrust disc there is an inwardly directed crimping for guiding the rolling bearing cage. The radially inner angular portion comprises a plurality of radially outwards directed claws produced by punching, i.e. by a machining operation.

Neither JP-A-2-31 022 nor U.S. Pat No. 4,168,682 discloses means for obtaining an assembly and installation safeguard or a controlled lubrication of the rolling bearing.

SUMMARY OF THE INVENTION

It is an object of the invention to provide an angular thrust disc for a thrust bearing having effective and simple means for the precise centering and retention of the angular thrust disc.

It is a further object of the invention to provide an installation safeguard for a non-confusable mounting of the angular thrust disc without, however, detracting from the operating life thereof. Still another object of the invention is to provide the angular thrust disc with means having a favorable influence on the lubrication of the thrust bearing.

The invention achieves these objects by the features recited in the characterizing parts of claims 1, 2, 5, 7, 12.

A common feature of all the embodiments is the arrangement of radially inwards and/or radially outwards directed projections or crimpings formed chiplessly on the angular portion of the angular thrust disc. The projections or the crimpings can be made by a simple manufacturing method without chip removal, and a disadvantageous material accumulation in the region of these retaining means for the angular thrust disc is avoided. Both the lug-like projection protruding locally radially from the angular portion and the crimping are suited for industrial scale production because they can be made synchronously with the angular thrust disc or in an immediately following production step. Further, the concept of the invention also permits an exact arrangement, that is to say, a precise positioning and shape determination of the projection and the crimping so that the peripheral groove in the shaft or in a housing into which the projection or the crimping engages can be made to closer tolerances which results in an improved centering and securing of the angular thrust disc and of the thrust bearing connected thereto.

In an embodiment of the invention relating to an angular thrust disc having a Z-shaped cross-sectional profile, radially inwards directed projections are provided on the radially outer angular portion, which projections are arranged axially spaced from the free end of said angular portion and, in the installed state of the angular thrust disc, lock into a peripheral groove of a shaft or a housing. The radially inner angular portion of the angular thrust disc comprises on its free end, i.e. on end projecting portions, circumferentially spaced, radially outwards directed crimpings which serve to guide a rolling bearing cage. Clear spaces between these portions constitute oil transfer locations which assure a controlled oil supply to the rolling bearing.

In another embodiment of the invention also relating to angular thrust discs with a Z-shaped cross-sectional profile, radially inwards and radially outwards directed crimpings are arranged in alternating sequence on the radially outer angular portion and respectively assure a guidance of the rolling bearing cage and a mounting safeguard for the angular thrust disc. The angular thrust disc of the invention with a Z-shaped cross-sectional profile further comprises, on its radially inner angular portion, radially outwards directed projections which are axially spaced from the free end thereof and which, in the installed state of the angular thrust disc, lock, for instance, into a peripheral groove of a shaft.

A further embodiment of the invention provides two spaced, parallel angular thrust discs on whose radial portions rolling elements are guided. One of these angular thrust discs has an angular portion on its outer periphery and the other, on its inner periphery. These radially offset angular portions radially define a hollow space into which rolling elements are inserted. For the guidance of a rolling bearing cage, the free ends of both these angular portions comprise a crimping pointing radially towards the hollow space. Additionally, at least one of the angular portions comprises a projection facing radially away from the hollow space and which is arranged axially spaced from the free end of the angular portion. This projection locks into a peripheral groove of a shaft or a housing to positionally fix the thrust bearing thereon.

To provide a secure mounting and a positional orientation of at least one of the angular thrust discs of the thrust bearing, the angular portion of the angular thrust disc concerned comprises two equally dimensioned reliefs situated opposite each other and extending up to the radial portion of the angular thrust disc. To create a safeguard against rotation of the angular thrust disc, these reliefs can cooperate in the installed state of the thrust bearing, for instance, with an appropriately flattened housing. The other, associated angular thrust disc comprises recesses matched with these reliefs.

The invention further covers an angular thrust disc having a U-shaped cross-sectional profile turned through 90° and having two axial angular portions pointing in the same direction. Both angular portions comprise chiplessly made radially directed crimpings or stampings.

Advantageously, the radially inner angular portion has a larger axial dimension than the radially outer angular portion. The protruding part of the inner angular portion can then act as an installation and/or mounting security device. It is further advantageous if the free end of the radially inner angular portion comprises an inwards directed crimping which constitutes an installation safeguard for the angular thrust disc. According to the invention, the radially outer angular portion likewise comprises on its free end, a radially inwards directed crimping for guiding a rolling bearing cage. For an improved oil supply of the thrust bearing, the free ends of both the inner and the outer angular portion can comprise circumferentially spaced recesses through which lubricating oil can enter and exit radially from the thrust bearing.

The invention likewise covers an angular thrust disc having an L-shaped cross-sectional profile. On the outer periphery of its radial portion, this angular thrust disc comprises an angular portion on which radially outwards directed lug-like projections made by chipless stamping are arranged in alternating sequence with radially inwards directed crimpings. These radially inwards directed crimpings on the free end serve to guide a rolling element cage, while the radially outwards directed projections which are axially spaced from the free end serve particularly to positionally fix the angular thrust disc.

BRIEF DESCRIPTION OF THE DRAWINGS

FIG. 1 is a view of an angular thrust disc of a preferred embodiment of the invention having a Z-shaped cross-sectional profile;

FIG. 2 is a side view along line A—A of the angular thrust disc of FIG. 1;

FIG. 3 is an enlarged view of the detail "A" of FIG. 2;

FIG. 7 is a view of a thrust bearing having two angular thrust discs of the invention;

FIG. 8 is a sectional view along line B—B of FIG. 7;

FIG. 9 is an enlarged sectional representation of the detail "D" of FIG. 8;

FIG. 10 is a front view of a thrust bearing having two angular thrust bearings with an L-shaped cross-sectional profile;

FIG. 11 is a longitudinal cross-section taken along line C—C of FIG. 10;

FIG. 12 is an enlarged view of the detail "E" of FIG. 11;

FIG. 13 is an enlarged view of the detail "F" of FIG. 11;

FIG. 14 is a longitudinal cross-section through an angular thrust disc having a U-shaped cross-sectional profile turned through 90°;

FIG. 15 is an enlarged view of the detail "G" of FIG. 14;

FIG. 16 is a view of an angular thrust disc having an L-shaped cross-sectional profile;

FIG. 17 is an enlarged view of the detail "H" of FIG. 16.

DETAILED DESCRIPTION OF THE DRAWINGS

Figure 4:
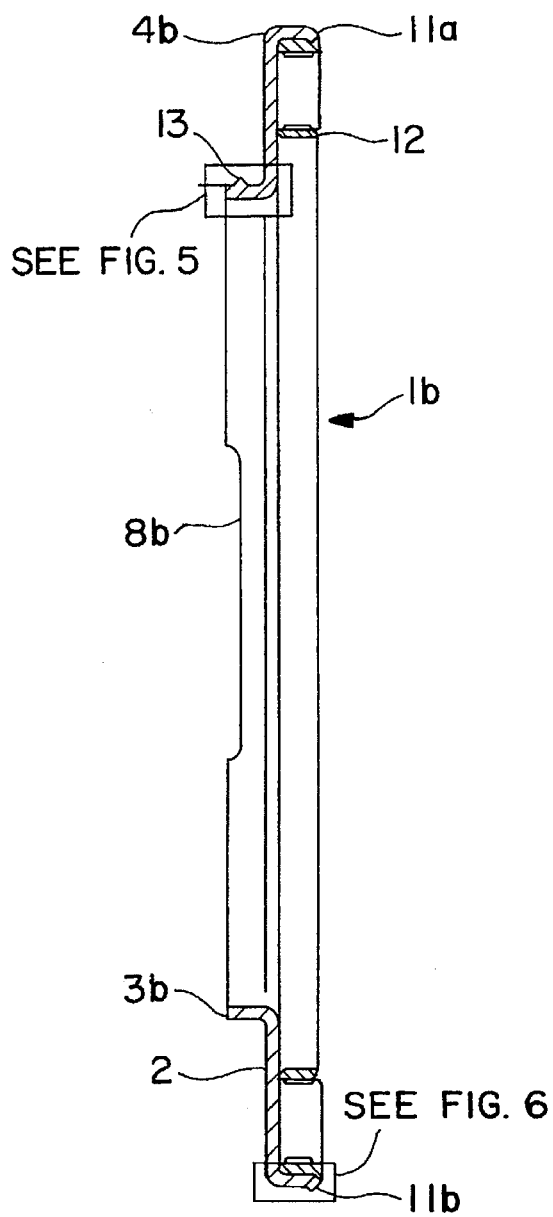
FIG. 4 is a longitudinal cross-section of another angular thrust disc having a Z-shaped cross-sectional profile.

An angular thrust disc 1a is represented in two different views in FIGS. 1 and 2.

The structure comprises a radial portion 2 which merges integrally at its inner and outer periphery into axially oppositely oriented angular portions 3a, 4a. The inner angular portion 3a is intended to guide a rolling bearing cage and is provided for this purpose with crimpings 5 on its end.

FIG. 1 clearly shows the arrangement of the crimpings 5 offset at 60° to one another. FIG. 2 shows the position of a radially inwards directed projection 6 made on the angular portion 4a for the centering and retention of the angular thrust disc 1a. FIG. 1 further shows the arrangement of three such projections 6 on the angular portion 4a which are offset at 120° to one another. Additionally, the angular portion 3a comprises circumferentially spaced recesses 8a which constitute a mounting safeguard.

An enlarged representation of the detail "A" of FIG. 2 is shown in FIG. 3 where the exact configuration of the projection 6 which has an almost semi-circular cross-section can be seen more clearly. The projection 6 which is made by chipless shaping, e.g. with the help of a stamping tool, can have a different shape from that shown in FIG. 3, for example, depending on particular requirements, it can be made in the form of a retaining lug or of a cam of triangular or saw-tooth shape. The shaping process of the projection 6 leads to the formation of a notch 7 on the side of the angular portion 4a opposed to the projection 6. FIG. 3 further shows the positive engagement of the projection 6 into the peripheral groove 10 of the shaft 9a to form a snap connection 25a, and also a mounting clearance 50 between the angular thrust portion 4a and the shaft 9a.

Figure 5:
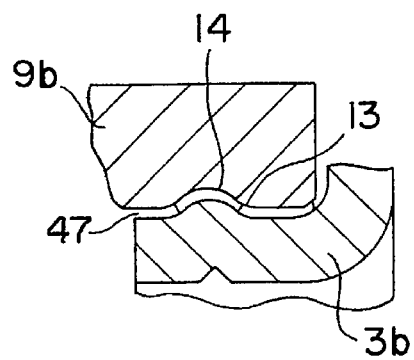
FIG. 5 is an enlarged view of the detail "B" of FIG. 4.
Figure 6:
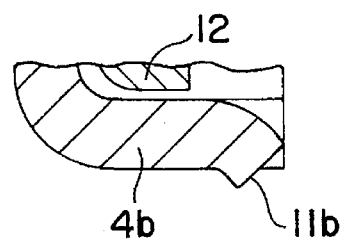
FIG. 6 is an enlarged view of the detail "C" of FIG. 4.

FIG. 4 is a longitudinal cross-sectional view of another angular thrust disc 1b also having a Z-shaped profile. On the outer periphery of the radial portion 2, there is arranged the angular portion 4b which comprises on its free end, radially inwards and radially outwards directed crimpings 11a, 11b in alternating sequence. The radially inwards directed crimping 11a serves to guide a rolling element cage 12 and the radially outwards directed crimping 11b, for example as a security device for the mounting and installation of the angular thrust disc 1b. Oppositely oriented to the angular portion 4b, there is arranged on the inner periphery of the radial portion 2, the angular portion 3b which comprises a radially outwards directed projection 13. This projection 13 which is axially spaced from the free end locks, in the installed state of the angular thrust disc 1b, into a peripheral groove 14 of a shaft 9b as shown in FIG. 5 with formation of a mounting clearance 47 between the angular portion 3b and the shaft 9b. An enlarged view of the crimping 11b can be seen in FIG. 6. To improve the lubrication and cooling of the rolling bearing, there are arranged on the end of the angular portion 3b, recesses 8b which enable a radial supply of oil to the rolling elements.

FIGS. 7 and 8 show a thrust bearing 15a comprising two angular thrust discs 21a, 21b between which there are inserted rolling elements 16 guided in a rolling element cage 17. Each of the angular thrust discs 21a, 21b comprises a right-angled angular portion 23a, 23b oriented towards the respective opposite angular thrust disc. The angular portion 23a of the angular thrust disc 21a is connected at the inner periphery and the angular portion 23b of the angular thrust disc 21b is connected at the outer periphery with the respective associated radial portion 22a, 22b. The angular portions 23a, 23b radially define a hollow space 28 in which rolling elements 16 are inserted and guided by a rolling element cage 17.

FIG. 8 shows the thrust bearing 15a in its installed state. The radial portion 22a of the angular thrust disc 21a bears by an abutment surface 19 against an annular shoulder of a shaft 20. On the opposite side, the angular thrust disc 21a comprises a raceway surface 18 on which the rolling elements 16 are guided with the help of a further angular thrust disc 21b. To positionally fix the thrust bearing 15a on the shaft 20, there are arranged in the end region of the angular portion 23a, radially inwards directed lug-like projections 26 which are made by chipless stamping and have a flattened, rounded cross-sectional contour.

The angular thrust disc 21a comprises a total of four projections 26 which are arranged offset at 90° to one another and during whose production a notch 7 is formed on the opposite side. On its free end, the angular portion 23a further comprises four radially outwards directed, circumferentially spaced crimpings 27a which assure a radially inner guidance of the rolling element cage 17, each crimping 27a being offset at 45° to a projection 26. A radially outer guidance of the rolling element cage 17 is effected by radially inwards directed crimpings 27b made on the free end of the angular portion 23b of the angular thrust disc 21b.

FIG. 9 is an enlarged view of the detail "D" and clearly shows the cross-sectional shape of the projection 26 which locks into a peripheral groove 24 of a shaft 20 to form a snap connection 25b with a mounting clearance 48.

FIGS. 10 to 12 show the thrust bearing 15b which is a modification of the thrust bearing 15a. In the description which now follows, only the differences in configuration of the thrust bearing 15b with respect to the thrust bearing 15a will be described. Identical parts of the two thrust bearings 15a, 15b are referenced with the same reference numbers so that reference can be made to FIGS. 7 to 9 for their description.

The thrust bearing 15b is provided with an installation safeguard which assures a non-confusable positioning of all parts. For this purpose, the angular portion 23a of the angular thrust disc 21c comprises two equally dimensioned reliefs 29 situated opposite each other and extending almost up to the radial portion 22a. The angular thrust disc 21d comprises recesses 30 which are geometrically matched with the reliefs 29. Thus, for example, an axially projecting collar of a housing in which the thrust bearing 15b is inserted can engage, in the installed state, into the clear space of the thrust bearing 15b created by the reliefs 29 and thus assure a positional orientation. This configuration assures a non-confusable installation even in cases in which several angular thrust discs of the same size are used in one component, e.g. in a transmission, but have to be differently oriented.

The geometric shape of the reliefs 29 can be seen more clearly in the side view of the thrust bearing 15b in FIG. 11.

FIGS. 12 and 13 are enlarged views of the details "E" and "F" of FIG. 11. In particular, the radial overlap between the rolling element cage 17 and the crimpings 27a, 27b arranged on the ends of the angular portions 23a and 23b becomes more evident.

In FIG. 14, an angular thrust disc 31 is represented which has a U-shaped cross-sectional profile turned through 90°. The radial portion 32 merges at its inner periphery with the angular portion 33 and at its outer periphery with the angular portion 34. The angular portion 33 has a larger axial length than the angular portion 34 and comprises on its free end several radially inwards directed crimpings 35a which form a mounting and installation safeguard for the thrust disc 31, there being arranged between the crimpings 35a, recesses 45. The outer angular portion 34 likewise comprises radially inwards directed crimpings 35b which serve to guide the rolling element cage 37.

In the enlarged representation of the detail "G" in FIG. 15, it can be seen that the angular portion 33 further comprises a radially inwards directed projection 36 which serves to positionally fix the angular thrust disc 31.

The structure of a further angular thrust disc 38 of the invention having an L-shaped cross-sectional profile can be seen in FIGS. 16 and 17. On the outer periphery of the radial portion 39, the angular thrust disc 38 comprises an angular portion 40 on whose free end there is arranged a radially inwards directed crimping 41. Besides this, the angular portion 40 also comprises radially outwards directed projections 42 which are axially spaced from its free end. The crimpings 41 are intended for the guidance of the rolling element cage 46. FIG. 17 shows an enlarged view of the detail "H" in which it can be clearly seen that the projection 42 locks into a peripheral groove 43 of a housing 44 with formation of a mounting clearance 49 between the angular portion 40 and the housing 44.

We claim:

1. An angular thrust disc for a thrust bearing comprising a radial portion which forms a raceway for rolling elements and merges with at least one axial angular portion on whose periphery retaining means are arranged which can assure a guidance of the angular thrust disc in a housing or on a shaft and which serve directly or indirectly to guide the rolling elements, characterized in that the angular thrust disc has a Z-shaped cross-sectional profile whose radially outer angular portion comprises radially inwards directed projections arranged axially spaced from a free end thereof and made by chipless stamping, which projections engage into a peripheral groove of a shaft or a housing in an installed state of the angular thrust disc to assure a fixing with clearance, and a free end of a radially inner angular portion of the angular thrust disc comprises circumferentially spaced and radially outwards directed crimpings and recesses which form an installation safeguard and permit an admission of oil into the thrust bearing.

2. An angular thrust disc for a thrust bearing comprising a radial portion which forms a raceway for rolling elements and merges with at least one axial angular portion on whose periphery retaining means are arranged which can assure a guidance of the angular thrust disc in a housing or on a shaft and which serve directly or indirectly to guide the rolling elements, characterized in that the angular thrust disc has a Z-shaped cross-sectional profile, a free end of whose radially outer angular portion comprises in alternating sequence, radially inwards and radially outwards directed crimpings, and a radially inner angular portion of the angular thrust disc comprises radially outwards directed projections arranged axially spaced from a free end thereof, which projections engage with clearance into a peripheral groove of a shaft or a housing in an installed state of the angular thrust disc.

3. An angular thrust disc of claim 2 wherein the free end of the inner angular portion comprises circumferentially spaced recesses which permit oil transfer.

4. An angular thrust disc of claim 2 wherein the radially outwards directed crimpings serve as an installation safeguard.

5. An angular thrust bearing assembly comprised of two parallel angular thrust discs each of which comprises a radial portion forming a raceway for rolling elements, one of the said two angular thrust discs comprising a radially outer angular portion on its outer periphery and other of said two angular thrust discs comprising a radially inner angular portion on its inner periphery, and the two angular portions radially defining a hollow space having a generally rectangular cross-section in which rolling elements are inserted, the angular portions further comprising retaining means which serve to positionally fix the thrust bearing in a housing or on a shaft and to guide a rolling element cage, characterized in that a free end of each of said two angular portions comprises circumferentially spaced crimpings pointing radially towards the hollow space, and the radially inner angular portion further comprises, axially spaced from the free end thereof, radially protruding projections facing away from the empty space, said projections engaging into a peripheral groove of a shaft or a housing in an installed state of the angular thrust disc to create a positional fixing with clearance, the radially inner angular portion comprises two reliefs situated opposite each other and extending almost up to the radial portion of the angular thrust disc, and the other angular thrust disc comprises recesses matched with the reliefs, the recesses and the reliefs together forming a mounting safeguard.

6. An angular thrust disc for a thrust bearing comprising a radial portion which forms a raceway for rolling elements and merges with at least one axial angular portion on whose periphery retaining means are arranged which can assure a guidance of the angular thrust disc in a housing or on a shaft and which serve directly or indirectly to guide the rolling elements, characterized by an angular thrust disc comprising a radially inner angular portion and a radially outer angular portion which both point in one direction to form a U-shaped cross-sectional profile turned through 90°, both angular portions comprising chiplessly made crimpings or stampings directed radially inwards towards a center of the angular thrust disc.

7. An angular thrust disc of claim 6 wherein the radially inner angular portion has a larger axial length than the radially outer angular portion.

8. An angular thrust disc of claim 6 wherein the crimpings are arranged on a free end of each of the angular portions, and the radially inner angular portion further comprises radially inwards directed projections arranged axially spaced from the free end thereof, said projections permitting a positional fixing of the angular thrust disc with clearance in the installed state.

9. An angular thrust disc of claim 6 wherein recesses which permit an oil supply to the thrust bearing are arranged between the circumferentially spaced crimpings on the free end of the inner angular portion.

10. An angular thrust disc of claim 6 wherein an axially protruding region of the radially inner angular portion and the crimpings on the free end together form an installation or mounting safeguard.

* * * * *